US008111275B2

(12) United States Patent
Eyal et al.

(10) Patent No.: US 8,111,275 B2
(45) Date of Patent: Feb. 7, 2012

(54) SYSTEM FOR OPTICALLY ADJUSTING AN IMAGING HEAD

(75) Inventors: Ophir Eyal, Ramat Ha-Sharon (IL); Shay Amsili, Kfar Yona (IL); Vitaly Burkatovsky, Rishon Le Zion (IL); Kobi Goldstein, Lapid (IL); Moshe Liberman, Rishon-LeZion (IL)

(73) Assignee: Eastman Kodak Company, Rochester, NY (US)

( * ) Notice: Subject to any disclaimer, the term of this patent is extended or adjusted under 35 U.S.C. 154(b) by 343 days.

(21) Appl. No.: 12/466,410

(22) Filed: May 15, 2009

(65) Prior Publication Data

US 2010/0289865 A1 Nov. 18, 2010

(51) Int. Cl.
*B41J 2/435* (2006.01)
(52) U.S. Cl. ........................................ 347/236; 347/246
(58) Field of Classification Search .................. 347/236, 347/246, 230, 26, 241, 256; 356/601, 609; 385/9, 12
See application file for complete search history.

(56) References Cited

U.S. PATENT DOCUMENTS

| 3,013,467 | A | | 12/1961 | Minksky et al. |
| 5,418,361 | A | * | 5/1995 | Pinnock et al. ......... 250/227.21 |
| 6,310,710 | B1 | | 10/2001 | Shahar et al. |
| 6,466,352 | B1 | | 10/2002 | Shahar et al. |
| 7,063,018 | B2 | * | 6/2006 | Smythies et al. ............ 101/486 |
| 7,525,670 | B1 | | 4/2009 | Burkatovsky |
| 2008/0018943 | A1 | | 1/2008 | Eyal et al. |

FOREIGN PATENT DOCUMENTS

EP 1 361 954 B1 1/2007

OTHER PUBLICATIONS

Tim Dabbs et al.: "Fiber-optic Confocal Microscope: FOCON", Applied Optics, Optical Society of America, US LNKD-DOI: 10.1364/A0.31.003030, vol. 31, No. 16, Jun. 1, 1992, pp. 3030-3035, XP000274821, ISSN: 0003-6935, the whole document.

* cited by examiner

*Primary Examiner* — Hai C Pham
(74) *Attorney, Agent, or Firm* — Nelson Adrian Bush (57) ABSTRACT

The present invention relates to a system for optically adjusting a computer-to-plate (CTP) imaging head which includes an light source (104), optical fiber (124) for transmitting light emitted from the light source; an imaging lens (204) for focusing light emitted from a distal end of the optical fiber (128) on a substrate; wherein a portion of light striking the substrate is reflected back to the distal end of the optical fiber; a fiber optic coupler (116) in the optical fiber which transmits the reflected light to a light detector (112); wherein the light detector measures intensity of the reflected light; and a control unit configured to adjust the imaging head according to the intensity of the reflected light.

13 Claims, 7 Drawing Sheets

SYSTEM FOR OPTICALLY ADJUSTING AN IMAGING HEAD

CROSS REFERENCE TO RELATED APPLICATIONS

Reference is made to commonly-assigned copending U.S. Patent Application Ser. No. US2006615025A filed Dec. 22, 2006, and entitled DIRECT ENGRAVING OF FLEXO-GRAPHIC PRINTING PLATES, by Siman Tov et al., the disclosure of which is incorporated herein.

FIELD OF THE INVENTION

This present invention relates to a confocal fiber optic sensor configured to operate within imaging heads of computer-to-plate (CTP) machines.

BACKGROUND OF THE INVENTION

Optical heads for imaging emit a plurality of light spots on a light-sensitive medium, the optical imaging head may be configured from an array of pigtailed laser diodes. Each laser diode is optically coupled to a proximal tip of a multi-mode optical fiber. The distal tips of the optical fibers are supported in a linear array by opto mechanical means, and imaged onto a printing plate.

Different types of plates may be used in CTP machines. For example, for direct engraving of a flexography plate high power lasers are used. To achieve a good ablation of the imaging media, the optical head should be provided with features such as autofocus, thermal lens compensating and plate sensitivity sensor.

Such features become feasible by the present invention which offers a confocal fiber optic sensor configured to operate within the imaging heads of CTP machines.

The confocal technique is well known in the literature. The fundamental principles and advantages of confocal microscopy are described in U.S. Pat. No. 3,013,467 (Minsky et al.).

U.S. Pat. Nos. 6,310,710 and 6,466,352 describe a rotating reading and writing scan system that incorporates a rotatable confocal microscopy. The rotatable configuration is the essence of those inventions, which also utilize the well known confocal microscopy. The novelty of these patents is in the new rotatable configuration. The present invention addresses different features in the realm of CTP devices, and more specifically in the field of three dimensional direct engraving of flexographic plates. The application utilizes the confocal principle as well, but beyond that it also offers new configurations which are adapted to achieve numerous features required for CTP devices.

SUMMARY OF THE INVENTION

Briefly, according to one aspect of the present invention is a system for optically adjusting a computer-to-plate (CTP) imaging head which includes an optical fiber for transmitting light emitted from the light source; an imaging lens for focusing light emitted from a distal end of the optical fiber on a substrate; wherein a portion of light striking the substrate is reflected back to the distal end of the optical fiber; a fiber optic coupler in the optical fiber which transmits the reflected light to a light detector; wherein the light detector measures intensity of the reflected light; and a control unit configured to adjust the imaging head according to the intensity of the reflected light.

The object of the present invention is to provide a confocal fiber optic sensor for imaging heads used for various types of CTP printing machines. The sensor provides new features that are essential in order to receive a good quality of the image on a plate.

These and other objects, features, and advantages of the present invention will become apparent to those skilled in the art upon reading of the following detailed description when taken in conjunction with the drawings wherein there is shown and described an illustrative embodiment of the invention.

DETAILED DESCRIPTION OF THE INVENTION

Figure 1:
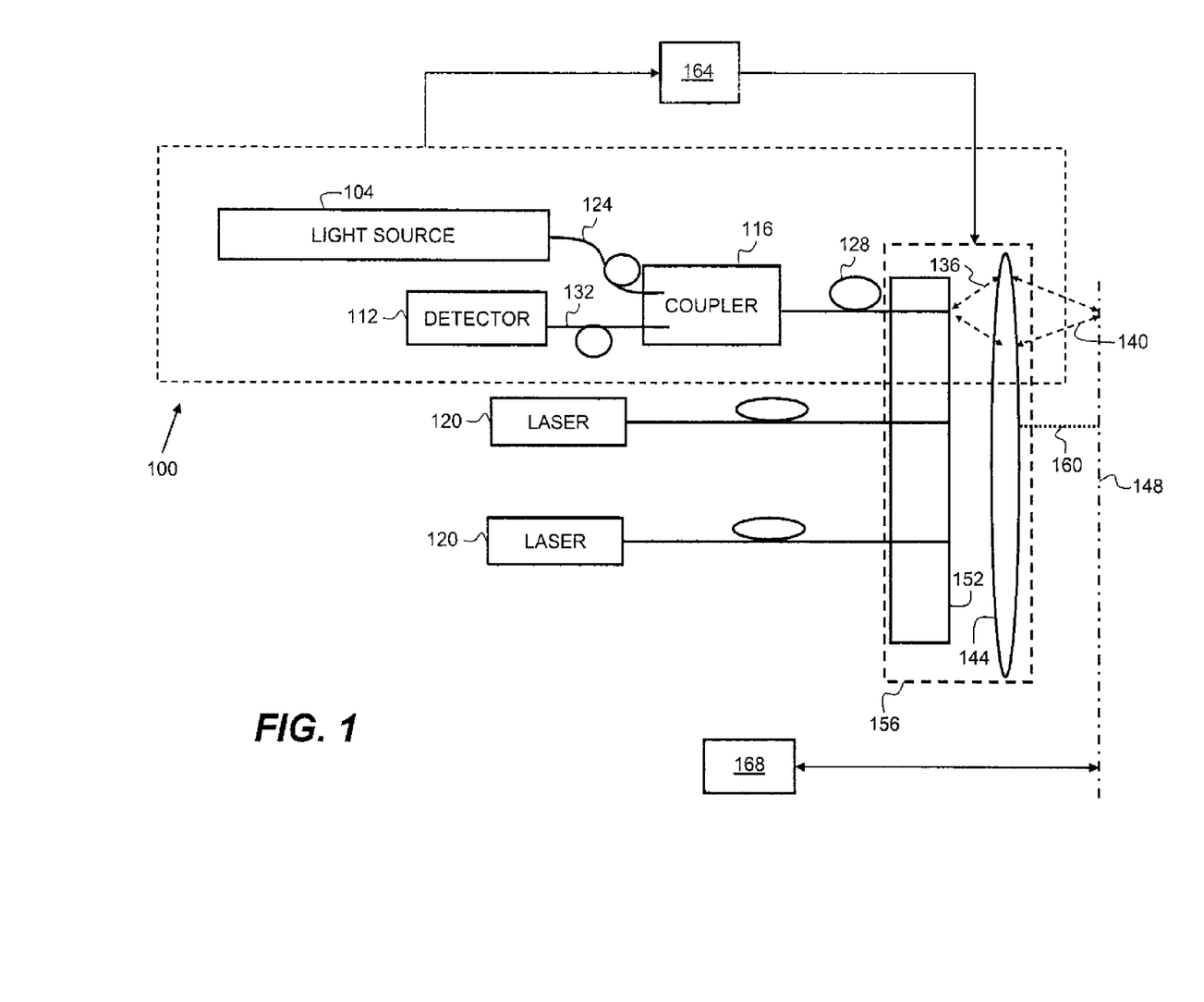
FIG. 1 is an illustration of a confocal sensor adjusted within an optical head.

FIG. 1 illustrates a confocal sensor 100. The confocal sensor 100 is integrated with a plurality of fiber coupled laser sources 120 into a mechanical assembly 152.

The distal tip of the fiber coupled laser source 120 is imaged on substrate 148 by imaging lens 144 to form an image.

The sensor 100 comprised of a light source 104 coupled to optical fiber 124 and to fiber optic coupler 116. Rays 136 emitted from the distal tip of optical fiber 128 are imaged on the surface of substrate 148. The back reflected light 140 is coupled to the emitting optical fiber 128 and reaches detector 112 via coupler 116 and optical fiber 132. The intensity measured by detector 112 is a function of the distance 160 to the printing plate. The position of the optical head 156 is adjusted according to the measured back reflected intensity levels, in order to achieve a predefined distance in respect to substrate 148. The optical head 156 includes a joint structure of mechanical assembly 152 and imaging lens 144. The focus can be achieved also by moving only the mechanical assembly 152, while keeping the imaging lens 144 fixed in its original position.

This solution is advantageous due to the fact that the confocal sensor 100 which is used as an auto focus device is integrated in the optical imaging head. This configuration enables good compensation for defocusing that might be caused by thermal tensing or the movement of different elements within the lens. Thermal lensing or misalignment of different elements that construct the lens may be caused when a fraction of the power is absorbed by the different elements that construct the compound lens causing temperature gradients.

Confocal sensor 100 may be used to calibrate other range related sensors. Confocal sensor 100 and other types of range related sensor might coexist in certain configurations of a CTP device and may operate simultaneously. For example, such a calibration can be performed for an external laser range finder 168. The external range finder 168 measures the range independent of the imaging lens 144. The position of the optical head 156 is changed according to a signal received from the external laser range finder 168 in order to achieve a predefined distance in respect to substrate 148.

The wavelength emitted by laser source 120 maybe dependent on its optical power. For example, for high power multi mode laser diodes that emit power of 10 Watts at 915 nm, a shift of, roughly, 1 nm per Watt is known. Since during operation the laser source 120 maybe operated at various optical powers, the confocal sensor 100 can be used to measure and compensate for defocusing that can be caused by the chromatic aberration of the imaging lens.

Figure 2:
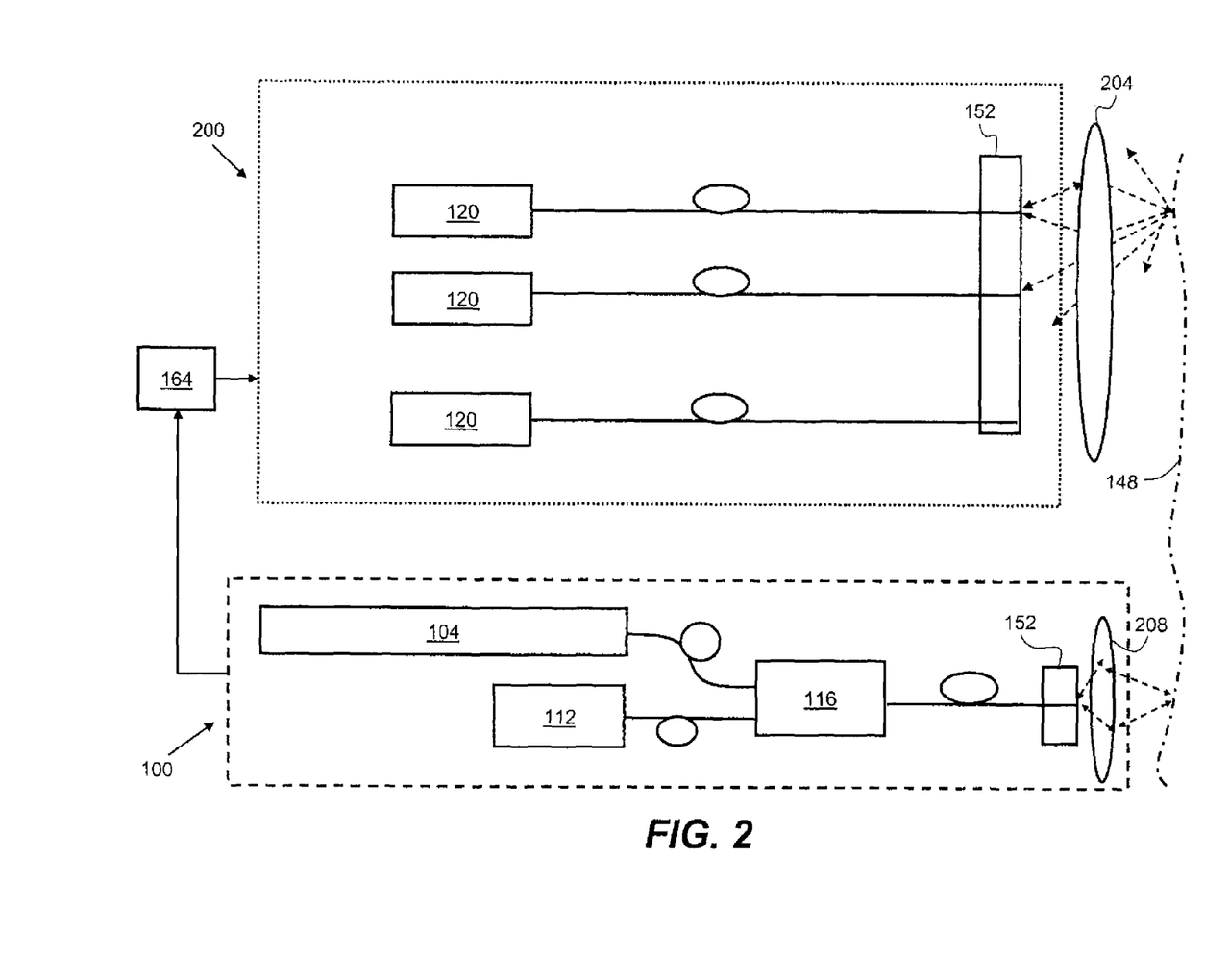
FIG. 2 is an illustration of a confocal sensor adjusted aside to an optical head.

FIG. 2 shows confocal sensor 100, used for auto focus purposes, operating independently and aside from the fiber optic mechanical assembly 152, wherein both are parts of an imaging head.

Plate substrate 148 is often constructed of surface irregularities. The confocal sensor 100 is configured to scan the plate substrate 148 in advance of the actual imaging unit 200. The readings of the irregular surface of plate substrate 148 are further communicated by feedback control unit 164 to imaging unit 200. The imaging unit will adjust its position relative to substrate 148 irregularities prior to the actual imaging being performed.

Different types of flexography plates may be used for direct engraving. Furthermore, the sensitivity of these flexographic plates may change over time. Hence, there is a need to test the sensitivity of the plate prior to imaging. The following procedure is suggested. The lasers 120 are adjusted to a predefined power and a sample plate 148 is irradiated. The confocal fiber optic sensor is then used to measure the depth and shape of the imaged holes in plate substrate 148. According to this measurement, the sensitivity of the plate substrate is calculated and the power of the lasers 120 is adjusted accordingly.

Light source 104 can be operated in two different modes. For example, if light source 104 is a multi-mode fiber-coupled laser diode, then in the first mode of operation, when operated at high power, it can be utilized to ablate and engrave the flexographic plate. In the second mode of operation, when the same light source 104 is operated at a relative low power, for example under the laser threshold, it can function as the light source of the confocal sensor. Operating light source 104 at a relative low power, under the laser threshold, may have some advantages. For example, in this mode of operation it will not activate the flexographic plate. Further more, the signal-to-noise ratio as measured by the detector 112 may be improved due to the shorter coherence length of the light emitted by 104.

In another embodiment of this invention confocal sensor 100 is used for measuring the reflectivity of an irradiated object. The intensity of the back reflected light 140 may be calibrated first by irradiating an imaging object with a known reflectivity. Flexographic-imaging plates are characterized by a reflectivity value of about 10 percent. When a higher reflectivity is measured, it may indicate on a faulty plate or on a rotating drum with no plate attached to it. The confocal sensor 100 can be also used to scan and measure the reflectivity of the substrate in advance of the actual imaging unit. In situations where a high reflectivity is sensed, an interlock will be activated in order to prevent the diodes from emitting high powers. Such a procedure will save the diodes from high values of back-reflected light that can damage them.

Figure 3:
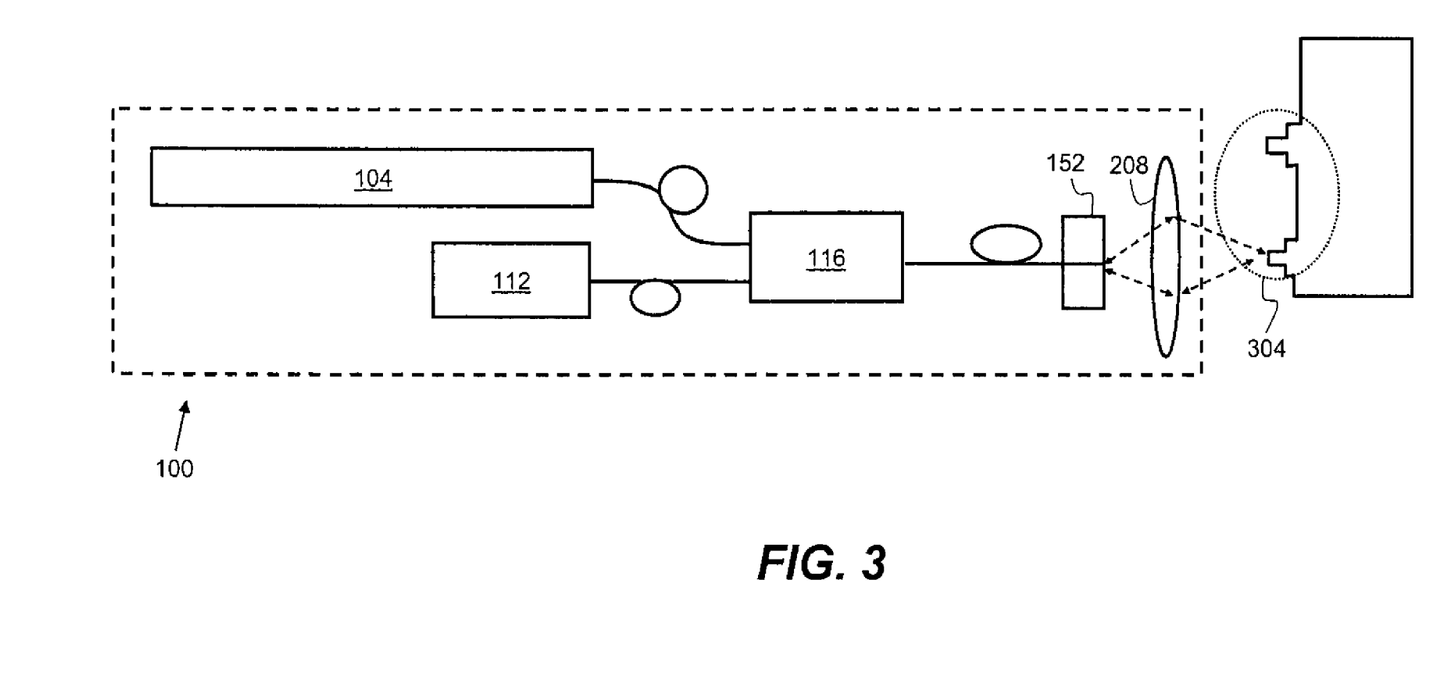
FIG. 3 is an illustration of confocal sensor used to measure the profile of a flexographic plate surface.

In another embodiment of this invention, a confocal sensor 100 is used to measure the profile of an engraved surface area 304 of a flexographic plate, this is depicted in FIG. 3.

Figure 4:
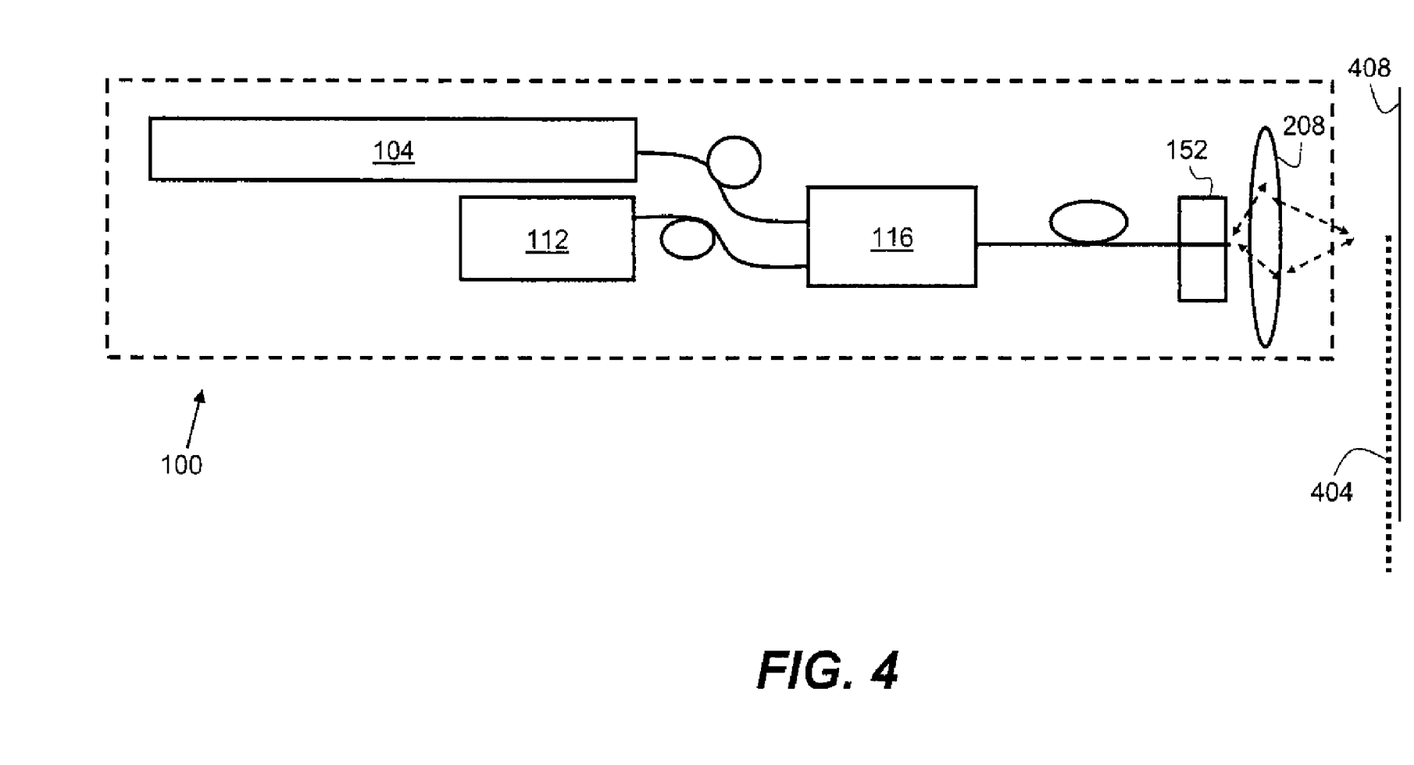
FIG. 4 is an illustration of a confocal sensor used to detect the edge of a plate.

In another embodiment of this invention as is depicted in FIG. 4, a confocal sensor 100 is used to detect the edge of a plate 404. The attached plate material 404 is smaller than substrate 408. There is a need before the actual imaging to find the exact position where plate material 404 starts. FIG. 4 shows a confocal sensor 100 emitting light on a plate material 404 attached to a plate substrate 408. Sensor 100 is used here for detecting the exact edge of plate 404.

Figure 5A:
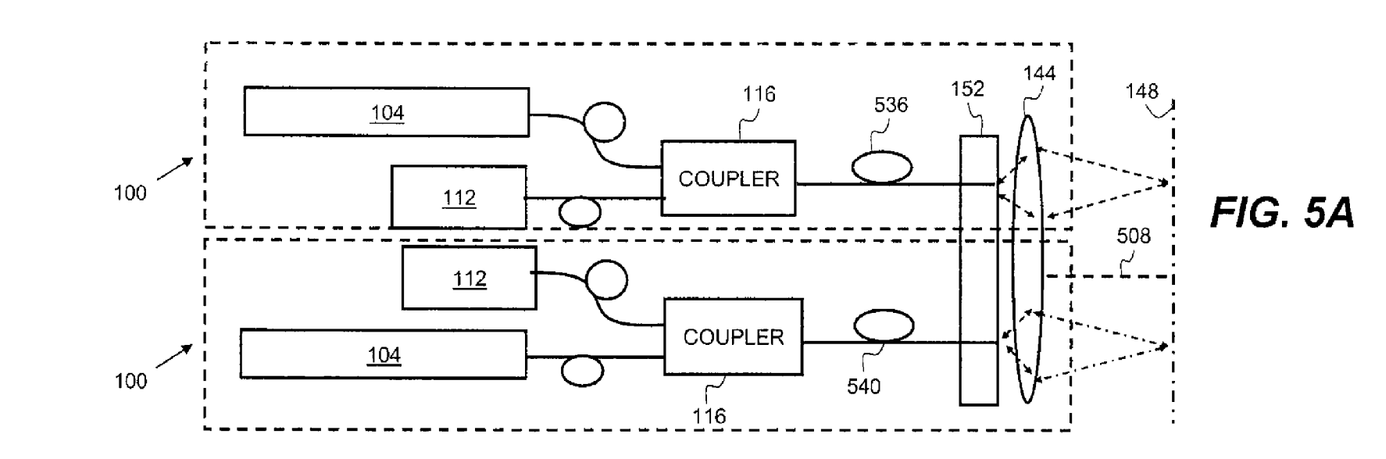
FIG. 5A is an illustration of two adjacent confocal sensors, utilizing optical fibers with different core diameters, operating simultaneously for expanding the dynamic range.
Figure 5B:
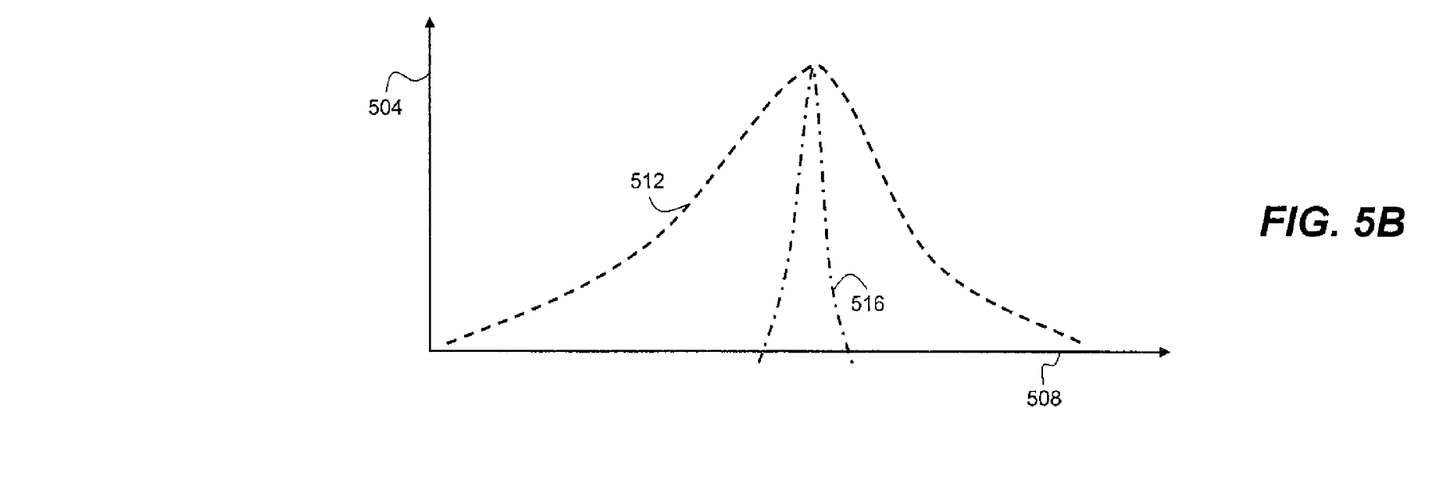
FIG. 5B is an illustration of a response function showing the relation between the back reflected signal as a function of distance to target.

In another embodiment of this invention, the resolution and dynamic range of the fiber optic confocal sensor 100 can be controlled by adjusting its optics. FIG. 5A describes a method for expanding the dynamic range by using two adjacent confocal sensors 100. The first uses a fiber optic guide 536 with a large core diameter and, therefore, provides relatively a large dynamic range. The second sensor 100 uses a fiber optic guide 540 with a smaller core diameter and, therefore, provides a relatively small dynamic range but with a better resolution. The usage of two confocal sensors 100 enables a measurement in both a wide dynamic range and a high resolution. FIG. 5B describes a schematic of a response function where the back reflected signal 504 is a function of distance 508 to target substrate 148. The response function is measured by scanning the distance to target and by simultaneously reading the values measured by detectors 112. The large dynamic range is indicated by function 512 derived from fiber optic 536 measurements whereas the higher resolution is indicated by function 516 derived from fiber 540 measurements.

Figure 6:
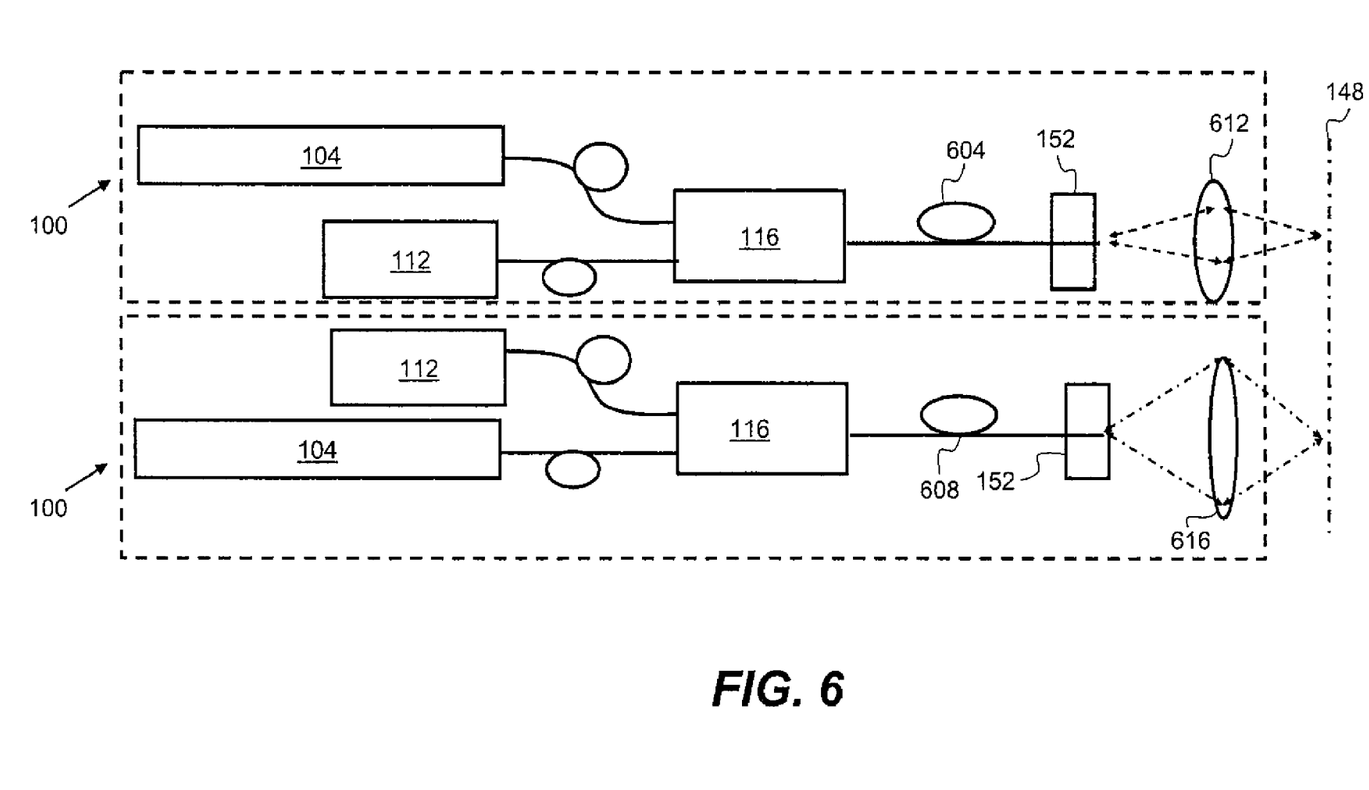
FIG. 6 is an illustration of two adjacent confocal sensors, utilizing imaging lenses with different NAs, operating simultaneously for expanding the dynamic range.

The expansion of the dynamic range can be also achieved by using two different imaging lenses in parallel, where each of the two imaging lenses provide different numerical aperture (N.A) at its output. FIG. 6 depicts two confocal sensors 100, each having an imaging lens with a different numerical aperture. First sensor 100 emits light via imaging lens 612 characterized by a narrow numerical aperture, and adjusted in front of the optical fiber 604. A second sensor 100 emits light via optical fiber 608 and imaging lens 616, that provides a wider numerical aperture and adjusted in front of the optical fiber 608.

Figure 7:
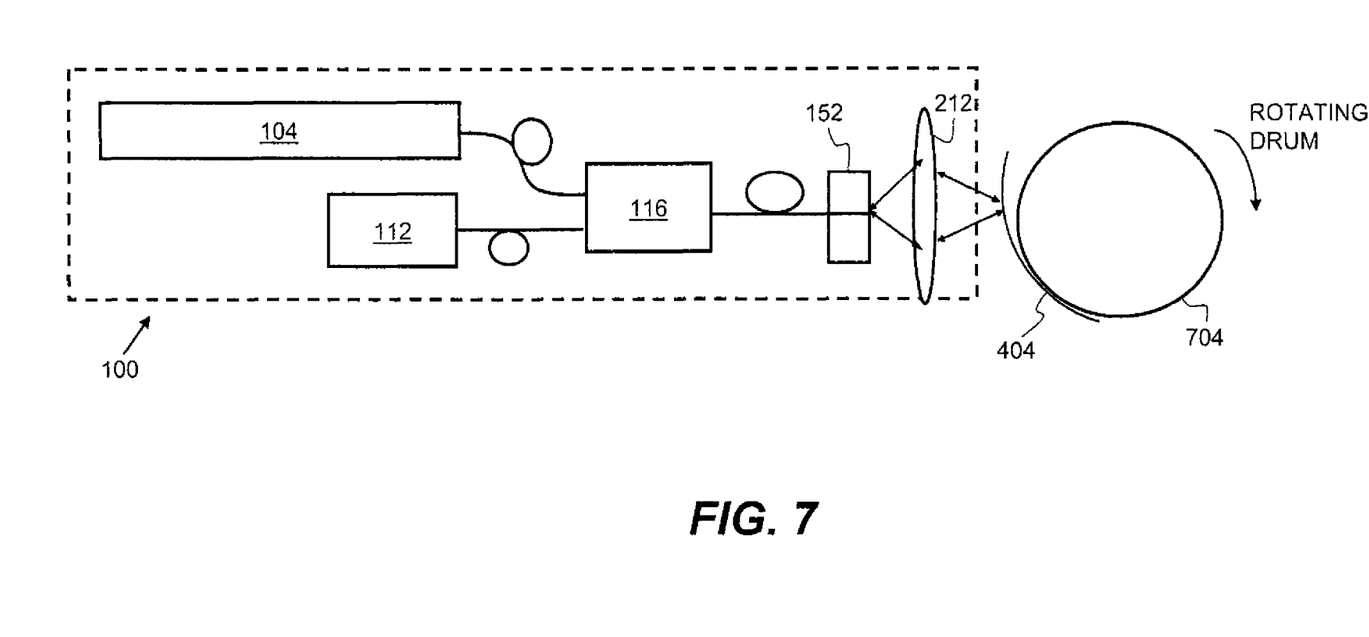
FIG. 7 is an illustration showing detection of plate separation from a rotating drum.

In another embodiment of this invention, the confocal sensor 100 can be used to detect separation of plate 404 from drum 704 as is depicted in FIG. 7. In CTP devices plate 404 is attached to a rotating drum 704. Drum 704 rotates in high rates. The centrifugal force created by the rotation of drum 704 combined with a possible malfunction of the CTP device holding the plate 404 attached to the drum 704 may cause the separation of plate 404 from drum 704. The confocal fiber optic sensor 100 can sense the separation of the plate from the drum and stop the drum rotation.

The invention has been described in detail with particular reference to certain preferred embodiments thereof, but it will be understood that variations and modifications can be effected within the scope of the invention.

PARTS LIST 100 confocal sensor (system for adjusting output power)
104 light source
112 light detector
116 fiber optic coupler
120 laser source
124 optical fiber connecting light source to coupler 128 optical fiber emitting light on substrate
132 optical fiber connecting coupler to detector
136 emitted rays to substrate
140 back reflected rays from substrate
144 imaging lens
148 substrate
152 mechanical assembly
156 optical head
160 distance from lens to printing plate
164 feedback control unit
168 external laser range finder
200 imaging unit
204 imaging lens
208 imaging lens
304 example of an ablated flexographic plate surface area
404 plate
408 plate substrate
504 back reflected signal axis
508 distance to target axis
512 first dynamic range
516 second dynamic range
536 thick optical fiber
540 thin optical fiber
604 optical fiber
608 optical fiber
612 imaging lens characterized by a narrow numerical aperture
616 imaging lens characterized by a wider numerical aperture
704 rotating drum

The invention claimed is:

1. A system for optically adjusting a computer-to-plate (CTP) imaging head comprising:
    an optical fiber for transmitting light emitted from a light source;
    an imaging lens for focusing light emitted from a distal end of said optical fiber on a substrate;
    wherein a portion of light striking said substrate is reflected back to the distal end of said optical fiber;
    a fiber optic coupler in said optical fiber which transmits said reflected light to a light detector;
    wherein said light detector measures intensity of the reflected light;
    a control unit configured to adjust said imaging head according to said intensity of the reflected light; and
    wherein said intensity of the reflected light is used to compensate for thermal lensing of said imaging lens.

2. The system according to claim 1 wherein a distance of said imaging head to said substrate is adjusted according to said intensity of the reflected light.

3. The system according to claim 1 wherein the distal end of said optical fiber is at the focal point of said imaging lens.

4. The system according to claim 1 wherein said imaging lens is a telecentric lens.

5. The system according to claim 1 wherein said intensity of the reflected light is a function of the distance to said substrate.

6. The system according to claim 1 wherein said intensity of the reflected light is used to measure a distance for the imaging head to the substrate.

7. A system for optically adjusting a computer-to-plate (CTP) imaging head comprising:
    an optical fiber for transmitting light emitted from a light source;
    an imaging lens for focusing light emitted from a distal end of said optical fiber on a substrate;
    wherein a portion of light striking said substrate is reflected back to the distal end of said optical fiber;
    a fiber optic coupler in said optical fiber which transmits said reflected light to a light detector;
    wherein said light detector measures intensity of the reflected light;
    a control unit configured to adjust said imaging head according to said intensity of the reflected light; and
    wherein said intensity of the reflected light is used to compensate for chromatic aberration of the imaging lens.

8. The system according to claim 7 wherein said intensity of the reflected light is used to find edges of said substrate.

9. The system according to claim 7 wherein said intensity of the reflected light is used to measure the sensitivity of said substrate.

10. The system according to claim 7 wherein said intensity of the reflected light is used to measure the reflectivity of said substrate.

11. The system according to claim 10 further comprising an interlock configured to stop operation of said light source according to said intensity of the reflected light.

12. The system according to claim 7 wherein said substrate is a printing plate.

13. A system for optically adjusting a computer-to-plate (CTP) imaging head comprising:
    an optical fiber for transmitting light emitted from a light source;
    an imaging lens for focusing light emitted from a distal end of said optical fiber on a substrate;
    wherein a portion of light striking said substrate is reflected back to the distal end of said optical fiber;
    a fiber optic coupler in said optical fiber which transmits said reflected light to a light detector;
    wherein said light detector measures intensity of the reflected light;
    a control unit configured to adjust said imaging head according to said intensity of the reflected light; and
    wherein said intensity of the reflected light is used to determine detachment of said printing plate from a drum of said CTP.

* * * * *